(12) United States Patent
Hughes et al.

(10) Patent No.: US 9,158,702 B2
(45) Date of Patent: Oct. 13, 2015

(54) APPARATUS AND METHOD FOR IMPLEMENTING A SCRATCHPAD MEMORY USING PRIORITY HINT

(71) Applicant: Intel Corporation, Santa Clara, CA (US)

(72) Inventors: Christopher J. Hughes, Santa Clara, CA (US); Daya Shankar Khudia, Ann Arbor, MI (US); Daehyun Kim, San Jose, CA (US); Jong Soo Park, Santa Clara, CA (US); Richard M. Yoo, Stanford, CA (US)

(73) Assignee: INTEL CORPORATION, Santa Clara, CA (US)

( * ) Notice: Subject to any disclaimer, the term of this patent is extended or adjusted under 35 U.S.C. 154(b) by 237 days.

(21) Appl. No.: 13/730,507

(22) Filed: Dec. 28, 2012

(65) Prior Publication Data

US 2014/0189247 A1   Jul. 3, 2014

(51) Int. Cl.
*G06F 12/12* (2006.01)
*G06F 12/10* (2006.01)

(52) U.S. Cl.
CPC .......... *G06F 12/1009* (2013.01); *G06F 12/123* (2013.01); *G06F 12/127* (2013.01); *G06F 2212/69* (2013.01)

(58) Field of Classification Search
CPC . G06F 12/1009; G06F 12/127; G06F 12/123; G06F 2212/69
USPC .................................. 711/144, 145, 156, 163
See application file for complete search history.

(56) References Cited

U.S. PATENT DOCUMENTS

| | | | |
|---|---|---|---|
| 6,393,525 B1 | 5/2002 | Wilkerson et al. | |
| 6,490,654 B2 | 12/2002 | Wickeraad et al. | |
| 6,643,737 B1 | 11/2003 | Ono | |
| 6,662,173 B1 | 12/2003 | Hammarlund et al. | |
| 6,901,483 B2 * | 5/2005 | Robinson et al. | 711/133 |
| 6,996,678 B1 | 2/2006 | Sharma | |
| 7,010,649 B2 | 3/2006 | Davis et al. | |
| 7,177,985 B1 | 2/2007 | Diefendorff | |
| 7,562,179 B2 | 7/2009 | Brandt et al. | |
| 7,757,045 B2 | 7/2010 | Shannon | |
| 7,991,956 B2 | 8/2011 | Illikkal | |
| 8,131,931 B1 | 3/2012 | Roberts et al. | |
| 8,131,977 B2 | 3/2012 | Yasufuku | |
| 8,156,247 B2 * | 4/2012 | McMillen | 709/240 |

(Continued)

OTHER PUBLICATIONS

PCT/US2013/047374 Notification of Transmittal of the International Search Report and the Written Opinion of the International Searching Authority, or the Declaration, Mailed Aug. 28, 2013, 10 pages.

(Continued)

*Primary Examiner* — John Lane
(74) *Attorney, Agent, or Firm* — Nicholson De Vos Webster & Elliott LLP

(57) ABSTRACT

An apparatus and method for implementing a scratchpad memory within a cache using priority hints. For example, a method according to one embodiment comprises: providing a priority hint for a scratchpad memory implemented using a portion of a cache; determining a page replacement priority based on the priority hint; storing the page replacement priority in a page table entry (PTE) associated with the page; and using the page replacement priority to determine whether to evict one or more cache lines associated with the scratchpad memory from the cache.

21 Claims, 11 Drawing Sheets

(56) References Cited

U.S. PATENT DOCUMENTS

| | | |
|---|---|---|
| 8,380,703 B2 * | 2/2013 | Egan et al. ............... 707/716 |
| 8,943,340 B2 | 1/2015 | Ananthakrishnan |
| 2002/0078310 A1 | 6/2002 | Frank et al. |
| 2002/0116582 A1 * | 8/2002 | Copeland et al. ............ 711/133 |
| 2003/0177315 A1 | 9/2003 | Hooker |
| 2004/0083341 A1 | 4/2004 | Robinson et al. |
| 2004/0221110 A1 | 11/2004 | Rowlands et al. |
| 2005/0125513 A1 * | 6/2005 | Sin-Ling Lam et al. ...... 709/220 |
| 2006/0117145 A1 | 6/2006 | Sprangle et al. |
| 2006/0168403 A1 * | 7/2006 | Kolovson ............... 711/142 |
| 2008/0040551 A1 | 2/2008 | Gray et al. |
| 2008/0091874 A1 | 4/2008 | Waltermann et al. |
| 2008/0301421 A1 | 12/2008 | Hsu et al. |
| 2009/0157979 A1 * | 6/2009 | Gregg et al. ............... 711/141 |
| 2009/0172291 A1 | 7/2009 | Sprangle et al. |
| 2009/0222626 A1 | 9/2009 | Ingle et al. |
| 2010/0100715 A1 | 4/2010 | Gooding et al. |
| 2011/0145506 A1 | 6/2011 | Cherukuri et al. |
| 2011/0161589 A1 | 6/2011 | Guthrie et al. |
| 2012/0042123 A1 * | 2/2012 | Kolovson ............... 711/113 |
| 2012/0137075 A1 | 5/2012 | Vorbach |
| 2013/0145104 A1 | 6/2013 | Hsu |
| 2013/0191600 A1 * | 7/2013 | Kuesel et al. ............ 711/136 |
| 2013/0297876 A1 | 11/2013 | Yu |

OTHER PUBLICATIONS

PCT/US2013/047374 Writtien Opinion of the International Searching Authority, Mailed Aug. 28, 2013, 10 pages.

Raveendran, LLRU, Dec. 28, 2007, IEEE, ISBN 0-7695-3059-1, pp. 339-344.

Zhang Chuanjun, et al., A tag-based cache replacement, IEEE, Oct. 3, 2010, ISBN 978-1-4244-8936-7, pp. 92-97.

* cited by examiner

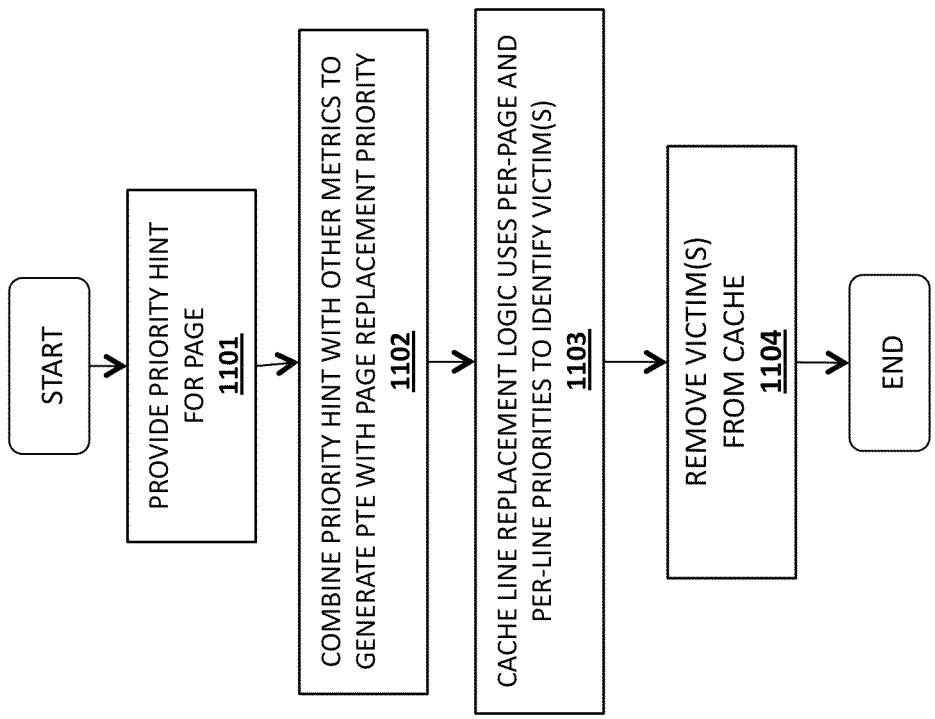

APPARATUS AND METHOD FOR IMPLEMENTING A SCRATCHPAD MEMORY USING PRIORITY HINT

BACKGROUND

1. Field of the Invention

This invention relates generally to the field of computer processors. More particularly, the invention relates to an apparatus and method for implementing a scratchpad memory.

2. Description of the Related Art

Scratchpad memories are local, high-speed memories that are manually controlled by the application. By precisely controlling data movements to and from scratchpads, applications can maximize performance, utilization, and energy efficiency. IBM's Cell and NVIDIA's recent GPUs, for example, provide such mechanisms.

Due to high hardware costs and a large increase to the architectural state, however, scratchpad memories are sometimes emulated on top of a cache-based memory hierarchy, typically by adjusting the cache line replacement policy (e.g., such as a least recently used (LRU) policy). For example, a processor will provide user-level instructions to directly adjust the replacement priority of a cache line, so that the application can effectively 'pin' a region of memory in the cache.

However, allowing user-level code to directly modify the cache replacement priority exposes fairness and security issues. For example, malicious code may aggressively mark its cache lines as pseudo-pinned, resulting in unfair utilization of shared cache space. Additionally, since the cache replacement priority is not maintained by the operating system, priority adjustments may survive context switching boundaries, and inadequately endow privileges to inappropriate software contexts (i.e., a process that is switched out may still occupy most/all of the cache space with pseudo-pinned lines).

BRIEF DESCRIPTION OF THE DRAWINGS

A better understanding of the present invention can be obtained from the following detailed description in conjunction with the following drawings, in which:

FIG. 11 illustrates a method in accordance with one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
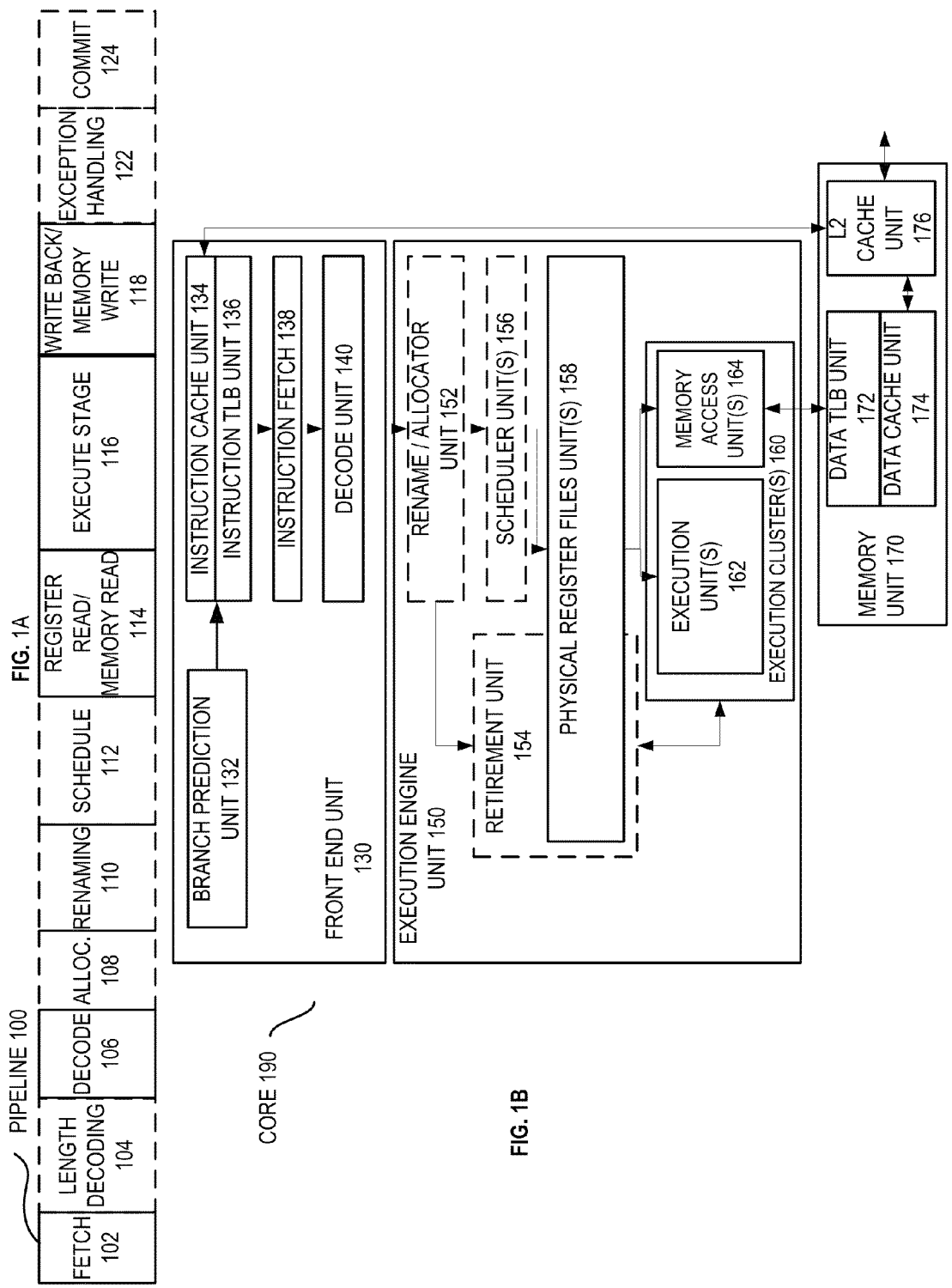
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, microcode entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
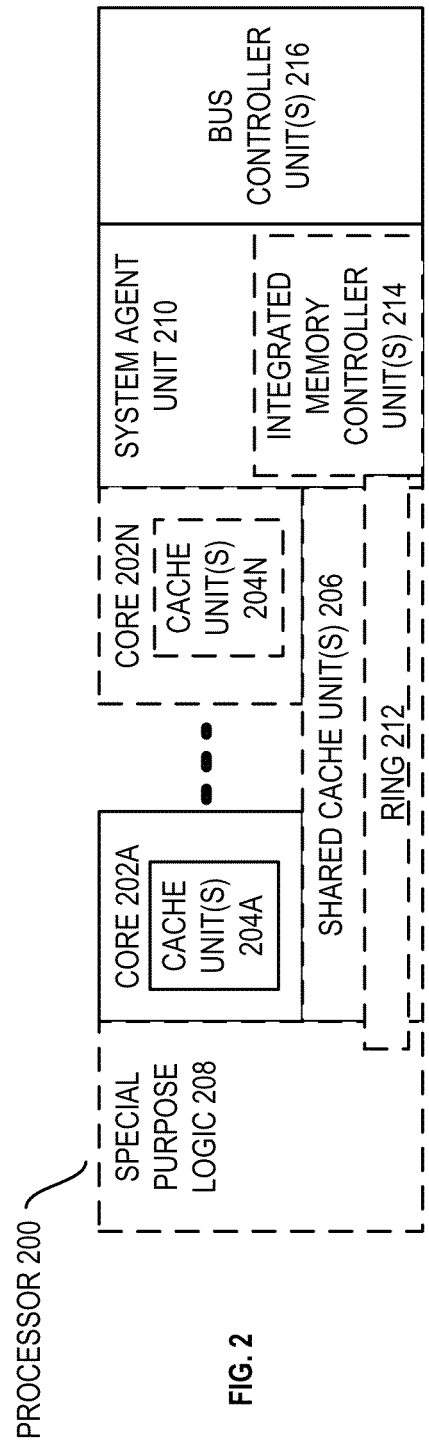
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
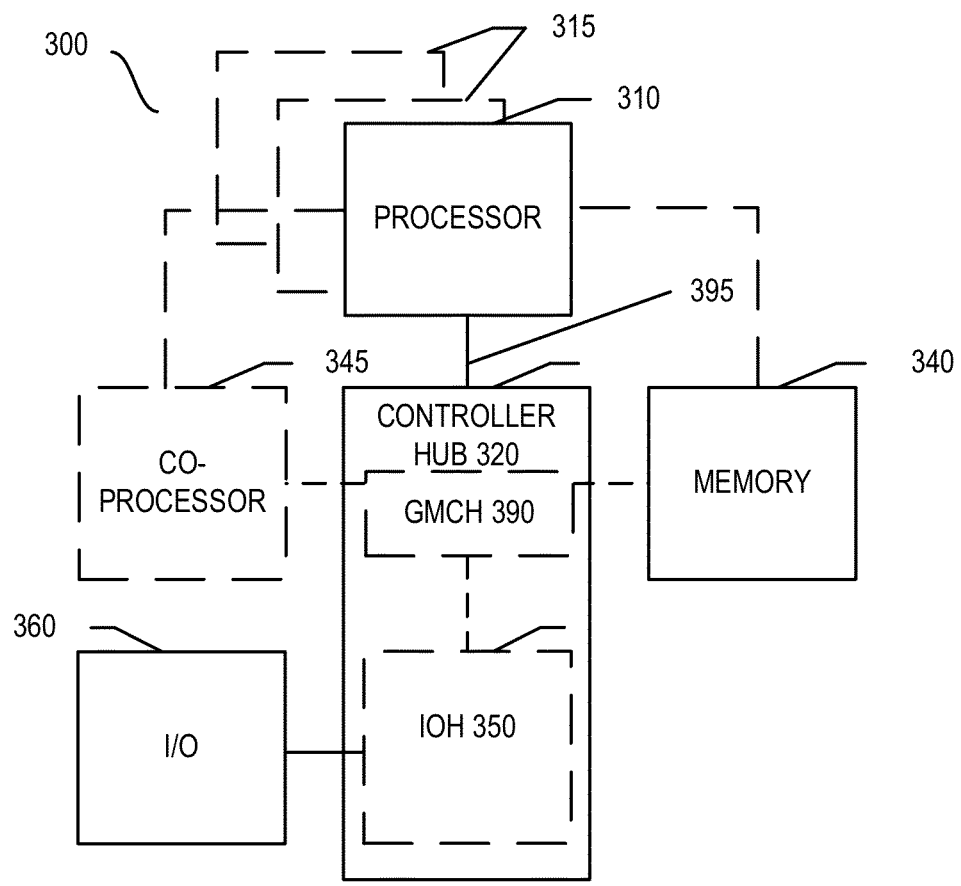
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
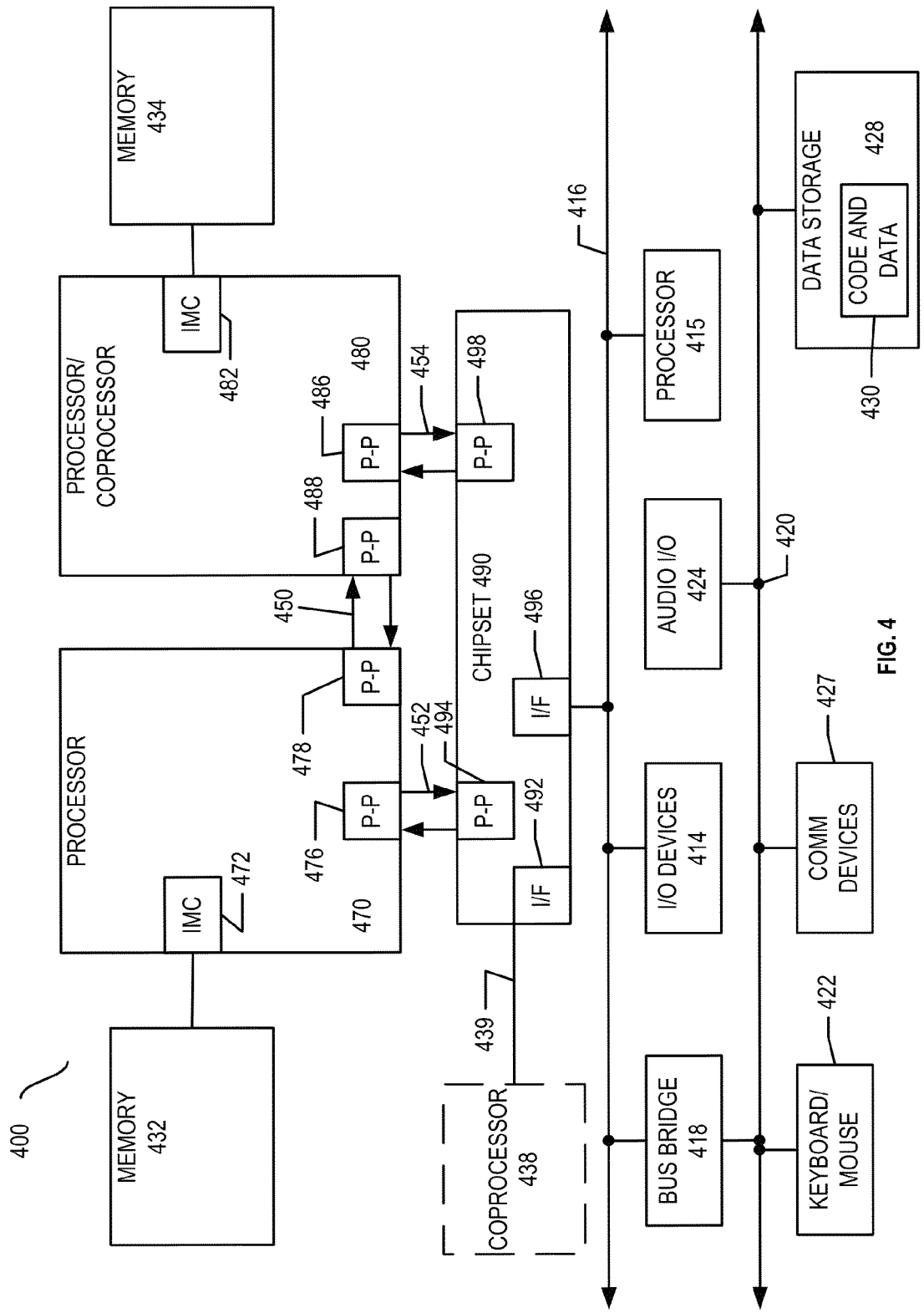
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited. As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
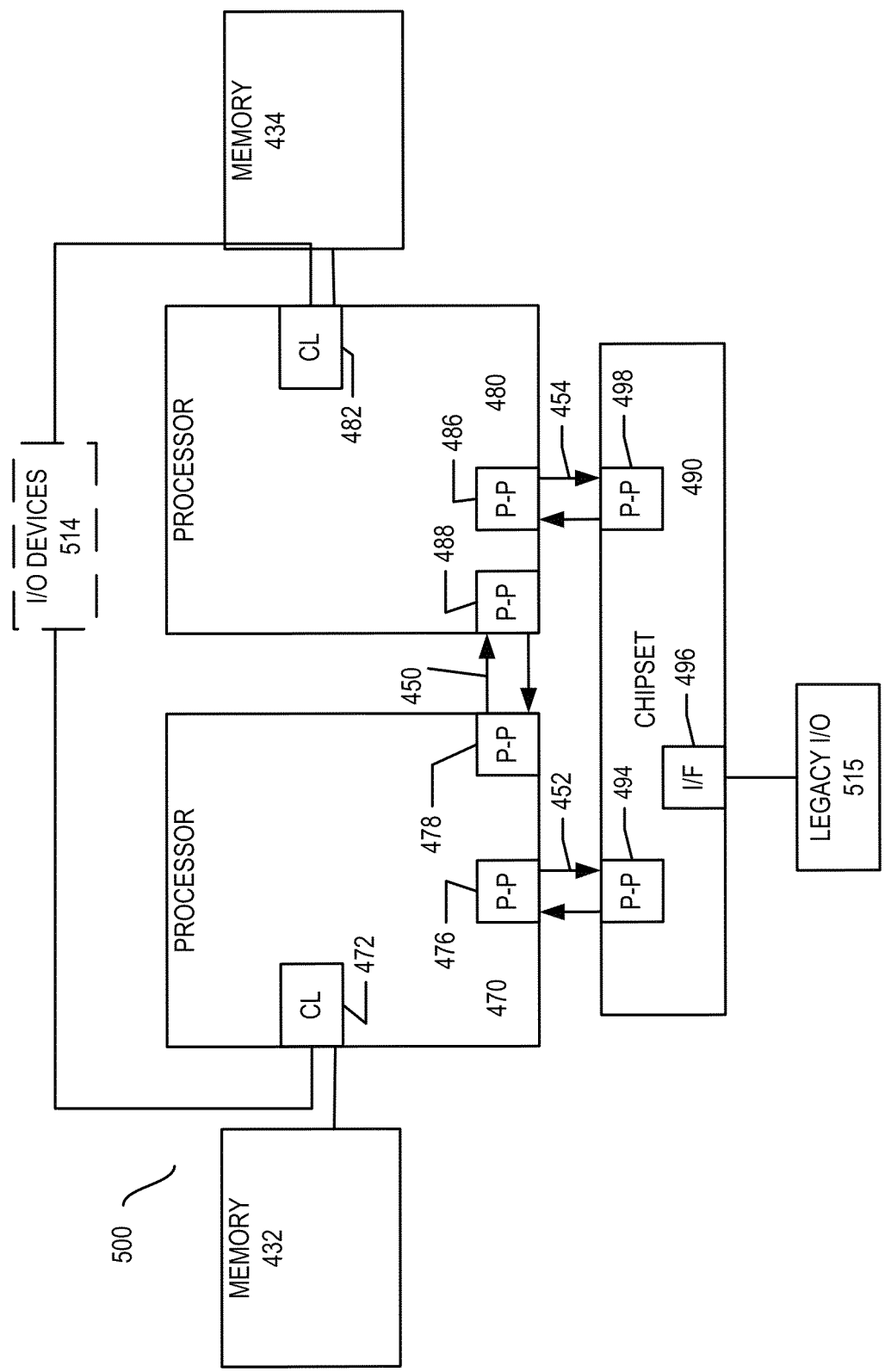
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
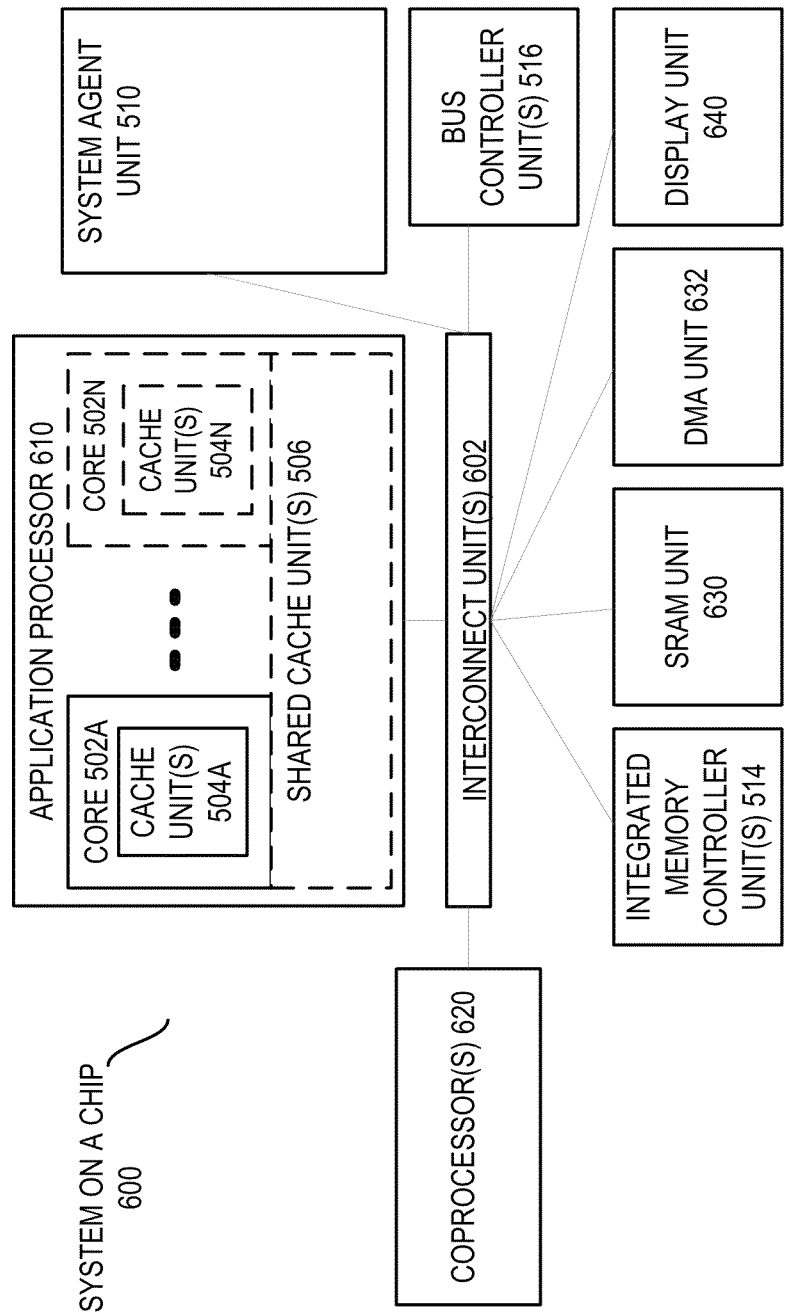
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
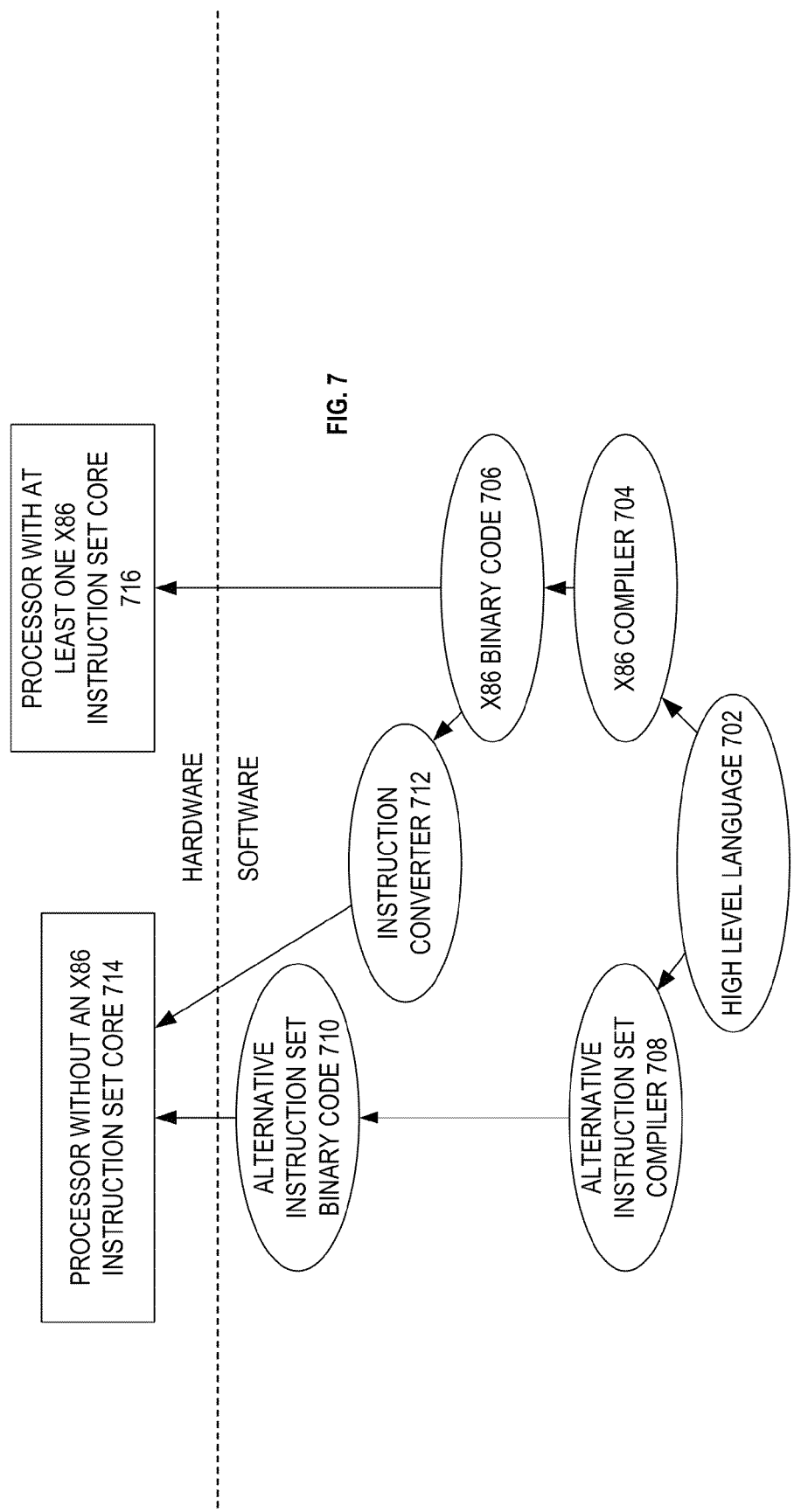
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Implementing a Scratchpad Memory

Figure 8:
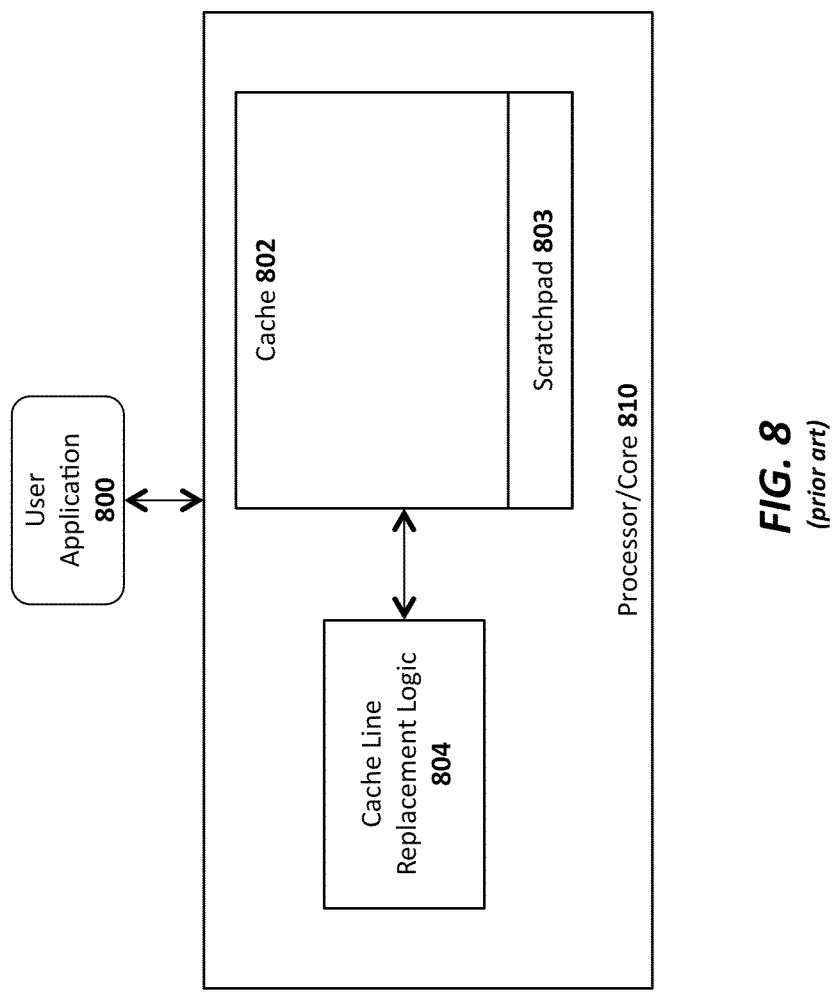
FIG. 8 illustrates a prior art scratchpad memory implemented within a caching architecture.

As illustrated in FIG. 8, scratchpad memories 803 are sometimes emulated on top of a cache-based memory hierarchy 802, typically by adjusting the cache line replacement policy employed by cache line replacement logic 804 (e.g., such as a least recently used (LRU) policy). For example, a processor/core 810 will provide user-level instructions to directly adjust the replacement priority of a cache line, so that the user application 800 can effectively 'pin' a region of memory in the cache.

However, allowing user-level code to directly modify the cache replacement priority exposes fairness and security issues. For example, malicious code may aggressively mark its cache lines as "pseudo-pinned," resulting in unfair utilization of shared cache space. Additionally, since the cache replacement priority is not maintained by the operating system, priority adjustments may survive context switching boundaries, and inadequately endow privileges to inappropriate software contexts (i.e., a process that is switched out may still occupy most/all of the cache space with pseudo-pinned lines).

Figure 9:
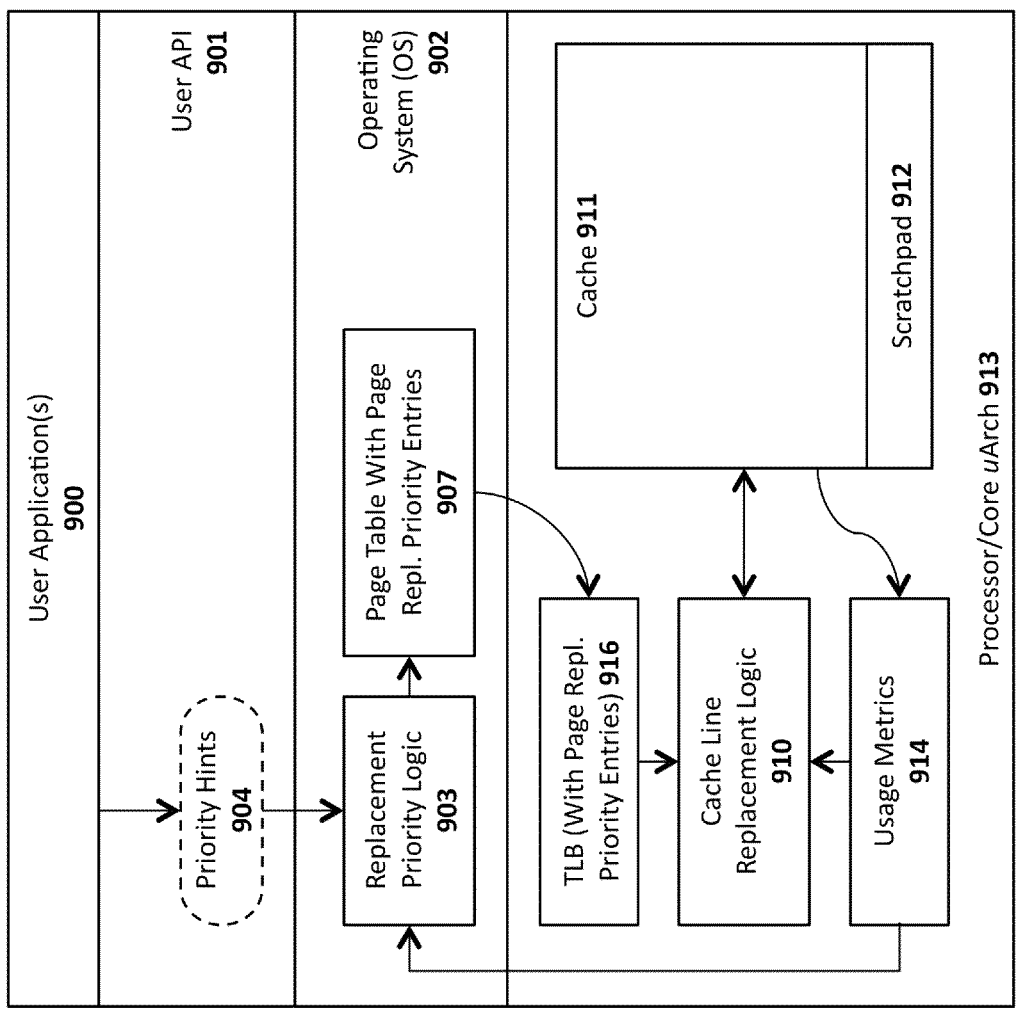
FIG. 9 illustrates a system architecture employed in one embodiment of the invention.

One embodiment of the invention employs a software/hardware co-design approach to solve the foregoing problems. Specifically, an operating system is used to enforce fair resource sharing and access control, and hardware is used for acceleration. As illustrated in FIG. 9, one embodiment of the invention includes components within the user application programming interface (API) 901, operating system (OS) 902, and processor/core microarchitecture 913.

In this embodiment, an API 901 is exposed to user applications 900 so that the user can supply replacement priority hints 904 on a page granularity (e.g., one hint per page). An example C-style pseudo code for providing replacement priority hints is shown below:

```
typedef enum {
    REPL_PRIORITY_HINT_EVICT = 0,
    REPL_PRIORITY_HINT_LRU,
    REPL_PRIORITY_HINT_MRU,
    REPL_PRIORITY_HINT_SCRATCHPAD,
} REPL_PRIORITY_HINT;
// addr must be on page boundary
int scpadctrl (void *addr, REPL_PRIORITY_HINT prt_hint);
```

As indicated in the pseudo code, to implement a scratchpad memory on top of a cache, a user may specify a hint REPL_PRIORITY_HINT_SCRATCHPAD to indicate a priority for the scratchpad implementation. Also shown are hints related to eviction policy, least recently used (LRU), and most recently used (MRU). Thus, the same priority hint mechanism described herein for scratchpad memory may be used to specify priority in other implementations (e.g., LRU=low priority, MRU=high priority, etc).

Internally, the API 901 will result in a system call to convey the priority hint information 904 to the OS 902. Alternatively, the replacement hint could be provided with a memory allocation request, in a similar manner to the existing mechanism for applications to request large pages, and the application must be prepared to handle denied requests (e.g., if an application reaches a limit on the number of scratchpad pages).

To determine the actual per-page replacement priority, one embodiment of the OS 902 includes replacement priority logic 903 which combines the hint 904 conveyed through the user API 901 with other metrics 914 which may be determined from the processor/core microarchitecture 913, such as hardware performance counters and monitoring schemes. Such metrics allow the replacement priority logic 903 to keep track of shared cache usage, and to adjust the priority for each page to enable fair sharing. In this sense, the priority information 904 provided through the user API 901 is not strictly binding. Rather, it is used in combination with other available information 914 to arrive at a replacement priority for each page 907.

Figure 10:
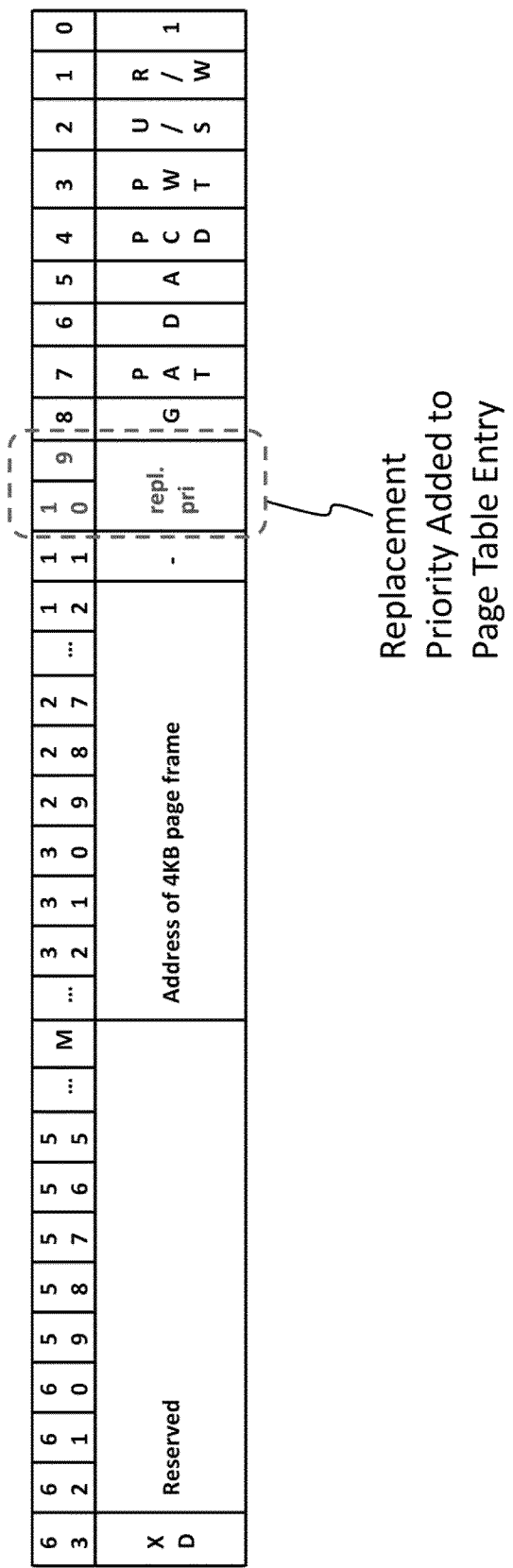
FIG. 10 illustrates a page table entry including a replacement priority field according to one embodiment of the invention.

Once the actual replacement priority has been determined, one embodiment of the OS 902 records the information as a separate field in a page table entry (PTE) 907. FIG. 10 illustrates an example modification to an PTE 1000 for an x86 implementation. It should be noted, however, that the underlying principles of the invention are not limited to an x86 architecture.

As illustrated in FIG. 9, in one embodiment, the replacement priority information stored in a page table entry will be loaded into the TLB 916 through the existing TLB refill mechanism. Conveyed priority information can then be used by cache line replacement logic 910 to determine the replacement candidates in a cache set 911, including the scratchpad portion of the cache 912. In one embodiment, per-page priority information is then recorded alongside the per-line state that is already maintained by the cache line replacement policy 910. Thus, when determining a cache line victim, the cache line replacement logic 910 takes both the per-page and per-cache-line priorities into account, and selects the victim accordingly.

A method in accordance with one embodiment of the invention is illustrated in FIG. 11. At 1101, a priority hint is provided for one or more pages (e.g., via the user API as described above). At 1102, the priority hint is combined with other metrics (e.g., hardware counters, cache miss rate for the page, etc) to arrive at a replacement priority for the page. The replacement priority is then stored in the PTE for that page within the page table. At 1103, the cache line replacement logic uses both the per-page and per-line priorities (or other per-line variables) to identify victims (i.e., cache lines to be replaced). At 1104, the identified victims are removed from the cache using standard cache management techniques.

Two specific implementations are contemplated, identified below as implementation 1 and implementation 2:

Implementation 1

1. Whenever a cache line is brought into a cache 911, the corresponding priority information for the cache line is retrieved from the TLB 916. If a specific cache level does not have TLBs (e.g., L2 caches), priority information can be propagated from the upper level (e.g., L1 caches) to lower levels through cache line request messages.

2. Retrieved per-page priority information is then recorded alongside the per-line state that is maintained by the replacement policy.

3. When a victim has to be determined for replacement, the replacement algorithm implemented by the cache line replacement logic 910 takes both the per-page and per-line priorities into account, and selects the victim accordingly.

4. To prevent a high priority being maintained for cache lines on a switched-out process, the operating system may, on a context switch, optionally reset the priority state in the cache. When the previously running context returns, items [1-3] described above will replenish the per-page priority information. In an alternative embodiment, when the operating system switches out a process, it systematically flushes all lines from high priority pages owned by that process; when it switches in a process, it prefetches all lines from all high priority pages.

Implementation 2

1. For a cache level that has a TLB, whenever a cache line needs to be replaced, the cache accesses the TLB to retrieve the corresponding per-page priority information for each cache line in a given set.

2. The replacement logic determines the cache line to evict.

3. The operating system can prevent incorrect priority endowment by using the already existing TLB shootdown mechanism. As is understood by those of skill in the art, a TLB shootdown flushes a group of TLB lookup translations.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
providing a priority hint of a page for a scratchpad memory implemented using a portion of a cache;
determining a page replacement priority based on the priority hint;
storing the page replacement priority of the page in a page table entry (PTE) of a page table associated with the page; and
using the page replacement priority to determine whether to evict one or more cache lines associated with the scratchpad memory from the cache.

2. The method as in claim 1 wherein using the page replacement priority comprises combining the page replacement priority with per-line state information to determine whether to evict a cache line associated with the scratchpad memory.

3. The method as in claim 2 wherein the per-line state information comprises an indication as to how frequently or how recently each cache line has been used.

4. The method as in claim 2 wherein the per-line state information comprises an indication as to whether the cache line is a most recently used (MRU) or a least recently used (LRU) cache line.

5. The method as in claim 1 further comprising:
loading the page replacement priority from the PTE to a translation lookaside buffer (TLB); and
reading the page replacement priority from the TLB.

6. The method as in claim 1 wherein determining a page replacement priority further comprises combining the priority hint with one or more usage metrics associated with the page to arrive at the page replacement priority.

7. The method as in claim 1 wherein the priority hint is generated by a user application which uses the scratchpad memory.

8. The method as in claim 1 wherein the priority hint is generated using a system call to provide the priority hint to an operating system (OS).

9. The method as in claim 8 wherein the OS maintains the page table storing the PTE in memory.

10. The method as in claim 1 wherein the priority hint is provided with a memory allocation request to an operating system (OS).

11. A processor comprising:
   a scratchpad memory to be implemented using a portion of a cache; and
   cache line replacement logic using a page replacement priority of a page associated with the scratchpad memory to determine whether to evict one or more cache lines associated with the scratchpad memory from the cache, the page replacement priority of the page to be stored in a page table entry (PTE) of a page table, the page replacement priority determined based on a priority hint of the page.

12. The processor as in claim 11 wherein using the page replacement priority comprises combining the page replacement priority with per-line state information to determine whether to evict a cache line associated with the scratchpad memory.

13. The processor as in claim 12 wherein the per-line state information comprises an indication as to how frequently or how recently each cache line has been used.

14. The processor as in claim 12 wherein the per-line state information comprises an indication as to whether the cache line is a most recently used (MRU) or a least recently used (LRU) cache line.

15. The processor as in claim 11 further comprising:
   a translation lookaside buffer (TLB) to store the page replacement priority; and
   the cache line replacement logic to read the page replacement priority from the TLB.

16. The processor as in claim 11 further comprising program code to determine the page replacement priority by combining the priority hint with one or more usage metrics associated with the page to arrive at a page replacement priority.

17. The processor as in claim 11 wherein the priority hint is generated by a user application which uses the scratchpad memory.

18. The processor as in claim 11 wherein the priority hint is generated using a system call to provide the priority hint to an operating system (OS).

19. The processor as in claim 18 wherein the OS maintains the page table storing the PTE in memory.

20. The processor as in claim 11 wherein the priority hint is provided with a memory allocation request to an operating system (OS).

21. A system comprising:
   a scratchpad memory to be implemented using a portion of a cache;
   an application programming interface (API) to provide a priority hint of a page for the scratchpad memory;
   an operating system (OS) to determine a page replacement priority of the page based on the priority hint and to store the page replacement priority in a page table entry (PTE) of a page table associated with the page; and
   cache line replacement logic using the page replacement priority to determine whether to evict one or more cache lines associated with the scratchpad memory from the cache.

* * * * *